United States Patent
Stieglitz et al.

(10) Patent No.: US 7,421,503 B1
(45) Date of Patent: Sep. 2, 2008

(54) METHOD AND APPARATUS FOR PROVIDING MULTIPLE AUTHENTICATION TYPES USING AN AUTHENTICATION PROTOCOL THAT SUPPORTS A SINGLE TYPE

(75) Inventors: Jeremy Stieglitz, San Jose, CA (US); John Zamick, Shipman (GB); Ilan Frenkel, Tel-Aviv (IL); Arthur Zavalkovsky, Netanya (IL); Darran Potter, West Mailing (GB)

(73) Assignee: Cisco Technology, Inc., San Jose, CA (US)

( * ) Notice: Subject to any disclaimer, the term of this patent is extended or adjusted under 35 U.S.C. 154(b) by 1054 days.

(21) Appl. No.: 10/346,967

(22) Filed: Jan. 17, 2003

(51) Int. Cl.
*G06F 15/16* (2006.01)

(52) U.S. Cl. .............................. 709/229; 709/230; 726/4

(58) Field of Classification Search ................. 709/227, 709/228, 229, 230, 232, 237; 713/151, 152, 713/168; 726/4
See application file for complete search history.

(56) References Cited

U.S. PATENT DOCUMENTS

2003/0226017 A1\* 12/2003 Palekar et al. ............... 713/168

OTHER PUBLICATIONS

L. Blunk, et al., "PPP Extensible Authentication Protocol (EAP)," IETF RFC 2284, Mar. 1998, pp. 1-15.

\* cited by examiner

*Primary Examiner*—William C. Vaughn, Jr.
*Assistant Examiner*—Scott Christensen
(74) *Attorney, Agent, or Firm*—Hickman Palermo Truong & Becker LLP

(57) ABSTRACT

A method is disclosed for providing multiple authentication types within an authentication protocol that supports a single type of authentication for a client in communication with an authorization server over a network. One or more authentication request packets compliant with an authentication protocol are sent to the client. Each of the packets comprises a type value that specifies multiple authentication, and a data field having a value that is structured in compliance with the authentication protocol. Each of the packets is associated with one of a plurality of different authentication conversations with the client. A plurality of responses is received from the client for each of the authentication conversations. The sending and receiving steps are repeated until results are determined for the authentication conversations. The client is authenticated based on results of each of the plurality of authentication conversations. Embodiments provide multiple Extensible Authentication Protocol (EAP) authentication methods.

43 Claims, 9 Drawing Sheets

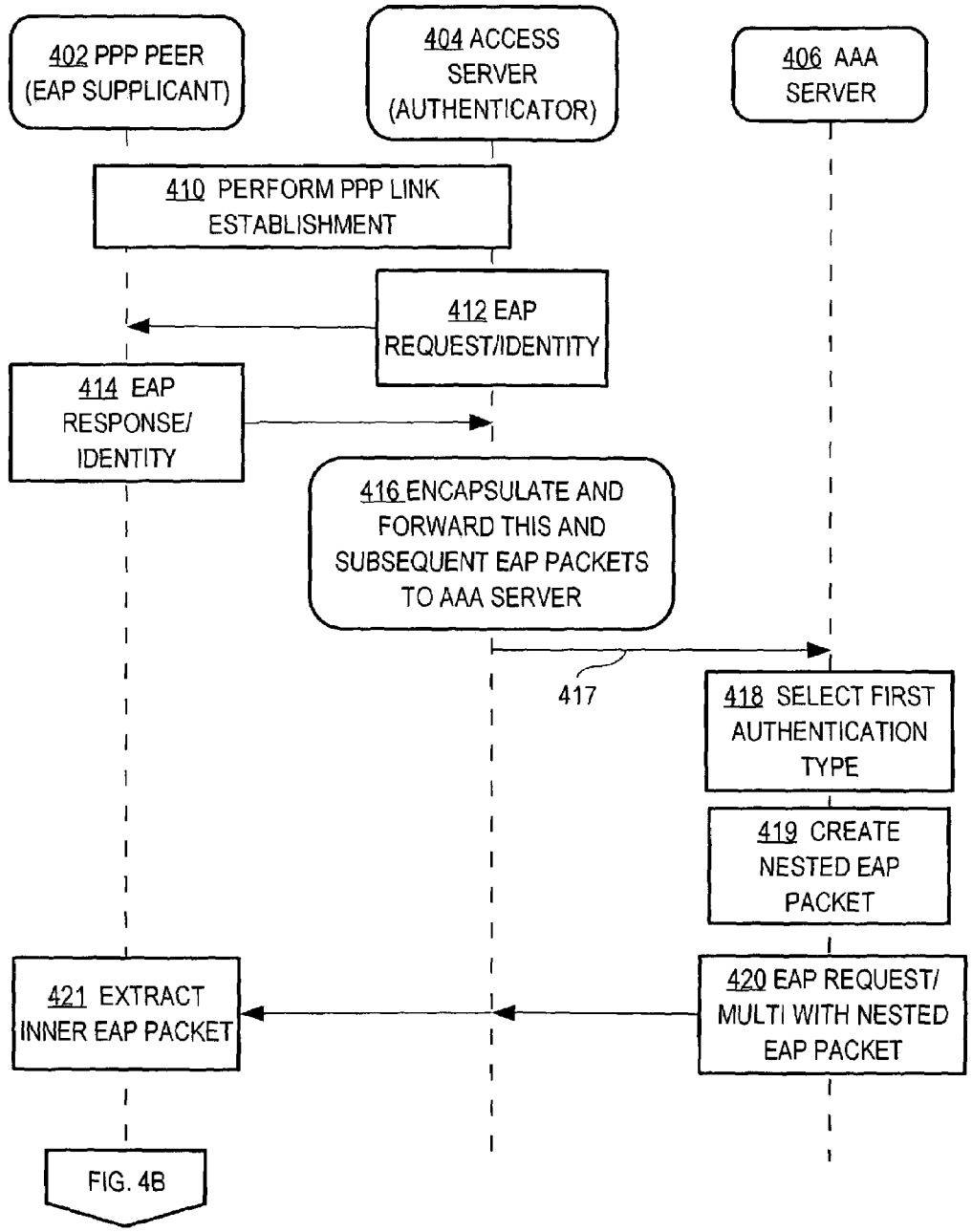

US 7,421,503 B1

METHOD AND APPARATUS FOR PROVIDING MULTIPLE AUTHENTICATION TYPES USING AN AUTHENTICATION PROTOCOL THAT SUPPORTS A SINGLE TYPE

FIELD OF THE INVENTION

The present invention generally relates to data processing in the field of user authentication in networks. The invention relates more specifically to a method and apparatus for providing multiple authentication types within an authentication protocol that supports a single type.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A user authentication process is normally used in networks that carry data, voice or other information to determine whether a user or client seeking to access a network actually is who the user purports to be. Numerous message protocols have been developed to specify how to perform authentication with network devices such as switches, routers, gateways, and gatekeepers. Typically, an authentication protocol requires a client to prove its identity by offering a data credential that is verified in a secure manner by an authentication server. Some such servers also perform network access control and accounting functions and therefore are termed authentication, access and accounting (AAA) servers. A commercial example is CiscoSecure Access Control Server, from Cisco Systems, Inc.

The emergence of numerous diverse authentication protocols spurred a movement toward developing a generalized authentication protocol that could be extended to support various platforms and purposes. Extensible Authentication Protocol (EAP), as described in IETF RFC 2284, is becoming the preferred user authentication protocol for most types of network sessions across different network devices. In large part, this popularity stems from the extensible nature of EAP, which allows any device that provides generic support for the protocol to transparently support new authentication protocols, known as EAP methods.

Although EAP provides flexibility to choose a different authentication type or EAP method for any single authentication, the protocol inherently limits each authentication to use a single method for each individual authentication request. Each authentication transaction under EAP is effectively atomic, and the outcome of each transaction may be one of only two states, namely success or failure.

As defined in RFC 2284, each EAP message includes a "Type" field, which indicates the EAP method being used for the authentication of the session. The Type field is required regardless of which encapsulation type is used to transport the EAP message, such as Remote Authentication Dial In User Service (RADIUS), which is defined in IETF RFC 2138; point-to-point protocol (PPP), as defined in RFC 1661; EAPOL, etc. As stated in RFC 2284, "Normally, the Type field of a Response message is the same as the Type of the Request. However, there is also a Nak Response Type for indicating that a Request type is unacceptable to the peer. When sending a Nak in response to a Request, the peer MAY indicate an alternative desired authentication Type which it supports." The RFC can be interpreted as if EAP prohibits changing the EAP method during an authentication session. As a result, network elements cannot run multiple authentication methods sequentially or in parallel.

When EAP was designed, this limitation was not problematic, because the authentication protocols it replaced had the same limitation.

As the requirements for network usage become more sophisticated and security of sessions become more critical, a protocol that provides only a binary result, success or failure, from a single authentication method, seriously limits the treatment that the network may apply to each request.

One approach to this problem is to abandon or modify the EAP protocol and replace it with a new protocol that does not suffer from the deficiency described above. However, this approach would require a significant investment in modifying or installing updated EAP supplicants (clients), EAP authenticators (network devices) and AAA servers, also requiring significant third party co-operation. Therefore, it is desirable to adopt an approach that utilizes the existing EAP infrastructure without modification.

Based on the foregoing, there is a clear need for an approach for performing multiple authentication methods within an authentication protocol that provides for a single authentication type. There is a need for a mechanism that provides for the use of an arbitrary number of authentication methods or types for each individual authentication request.

It would be useful to have such a mechanism that is compatible with existing protocol infrastructure in general, and compatible with unmodified EAP in particular.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A and FIG. 4B comprise a message flow diagram that illustrates messages that can be communicated by elements of FIG. 1 when an embodiment is in use;

DETAILED DESCRIPTION OF THE PREFERRED EMBODIMENT

Figure 1:
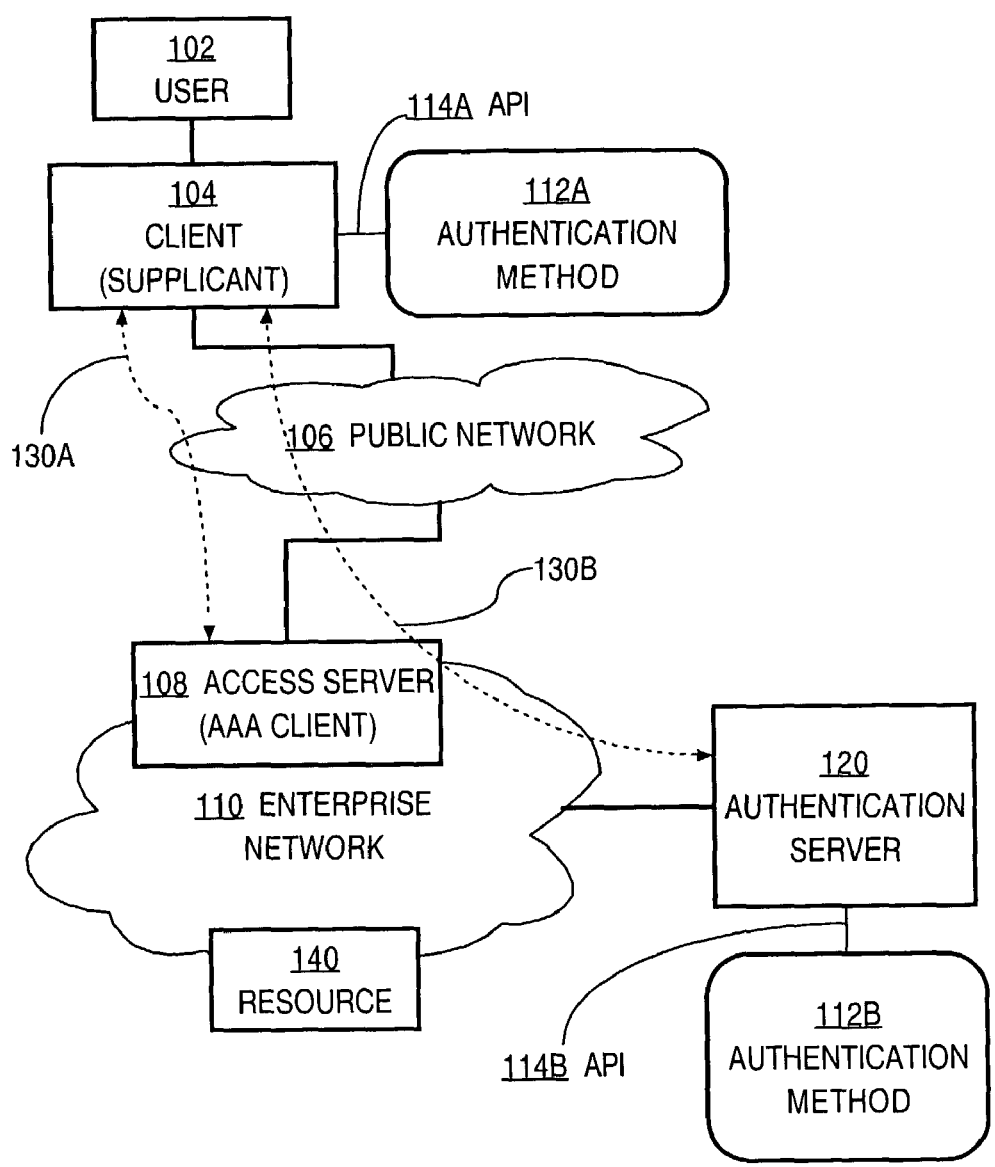
FIG. 1 is a block diagram that illustrates a network arrangement in which an embodiment can be used.

A method and apparatus for providing multiple authentication types within an authentication protocol that supports a single type of authentication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Structural and Functional Overview
2.0 Providing Multiple Authentication Types within an Authentication
   Protocol That Supports a Single Type of Authentication
   2.1 Process and Message Flow
   2.2 Using Multiple Authentication Types and Policy Rules
3.0 Implementation Mechanisms—Hardware Overview
4.0 Extensions and Alternatives 1.0 Structural and Functional Overview The needs identified in the foregoing Background, and other needs and objects that will become apparent for the following description, are achieved in the present invention, which comprises, in one aspect, a method for providing multiple authentication types within an authentication protocol that supports a single type of authentication for a client in communication with an authorization server over a network. One or more authentication request packets compliant with an authentication protocol are sent to the client. Each of the packets comprises a type value that specifies multiple authentications, and a data field having a value that is structured in compliance with the authentication protocol. Each of the packets is associated with one of a plurality of different authentication conversations with the client. A plurality of responses is received from the client for each of the authentication conversations. The sending and receiving steps are repeated until results are determined for the authentication conversations. The client is authenticated based on results of each of the plurality of authentication conversations.

Particular embodiments provide multiple Extensible Authentication Protocol (EAP) authentication methods, and are compatible with network access servers, AAA servers, and any suitable encapsulation protocol, such as PPP, RADIUS, etc. According to one embodiment, a new EAP method, termed "EAP-Multi," is defined. The EAP-Multi method is used for encapsulating single or multiple EAP conversations for different types of authentication (different EAP methods). Complex policy rules may define how to apply multiple authentication types to a particular client or user. As a result, a network can apply multiple levels of network access to a client or user based on whether the client or user succeeds in one, all, or multiple authentication processes.

In other aspects, the invention encompasses a computer apparatus and a computer-readable medium configured to carry out the foregoing steps.

FIG. 1 is a block diagram that illustrates a network arrangement in which an embodiment can be used. A user 102 is associated with a client 104 that is communicatively coupled to a public network 106 and indirectly communicatively coupled to an enterprise network 110. In the terminology of the RFC that describes EAP, a client system is termed a "supplicant," and in this description client 104 is such a supplicant. An access server 108, or AAA client, controls access to enterprise network 110 in cooperation with authentication server 120. The access server 108 is termed an AAA client because its requests are serviced by authentication server 120.

Client 104 is any network-compatible end station, such as a personal computer or workstation. Network 106 may be any local area network, wide area network, or one or more internetworks. Enterprise network 110 is any network, including a WLAN, that holds one or more network resources 140 that client 104 is seeking to access. In certain embodiments, networks 106, 110 may be the same; thus, FIG. 1 is intended to broadly encompass any network arrangement in which an untrusted client 104 is seeking access to a resource 140 that is held in a secure network.

Access server 108 is, in one embodiment, a network router that is configured to perform access control functions. An example is Cisco Access Server AS5300, commercially available from Cisco Systems, Inc., San Jose, Calif. The EAP-compliant embodiments described herein may be implemented using any EAP-capable platform, including switches, routers, network elements that support VPN, wireless gateways, firewalls, etc.

Authentication server 120 is a server-class computer that is configured to securely store user authentication information such as usernames and passwords, and to perform authentication protocols, algorithms, and supporting processes, such as one-time password (OTP) validation, encryption and decryption, message digest evaluation, etc. In one embodiment, authentication server 120 communicates with access server 108 using a secure protocol that is optimized for use in authentication. An example of a suitable protocol is RADIUS.

In this arrangement, client 104 must successfully authenticate itself to access server 108, in cooperation with authentication server 120, to gain access to resource 140. Any of several authentication protocols may be used to perform authentication. An example of a suitable authentication protocol is PEAP, which is an EAP-compliant protocol that is performed as part of establishing a PPP connection between client 104 and access server 108. In an object-oriented environment, logic that defines messages and actions performed as part of the authentication protocol can be structured as an authentication method 112A that client 104 accesses or calls using an application programming interface (API) 114A. A compatible authentication method 112B is callable by authentication server 120 using API 114B.

In general, under EAP . . . Accordingly, client 104 and authentication server 120 effectively establish a logical connection 130B until the authentication protocol terminates.

Figure 2A:
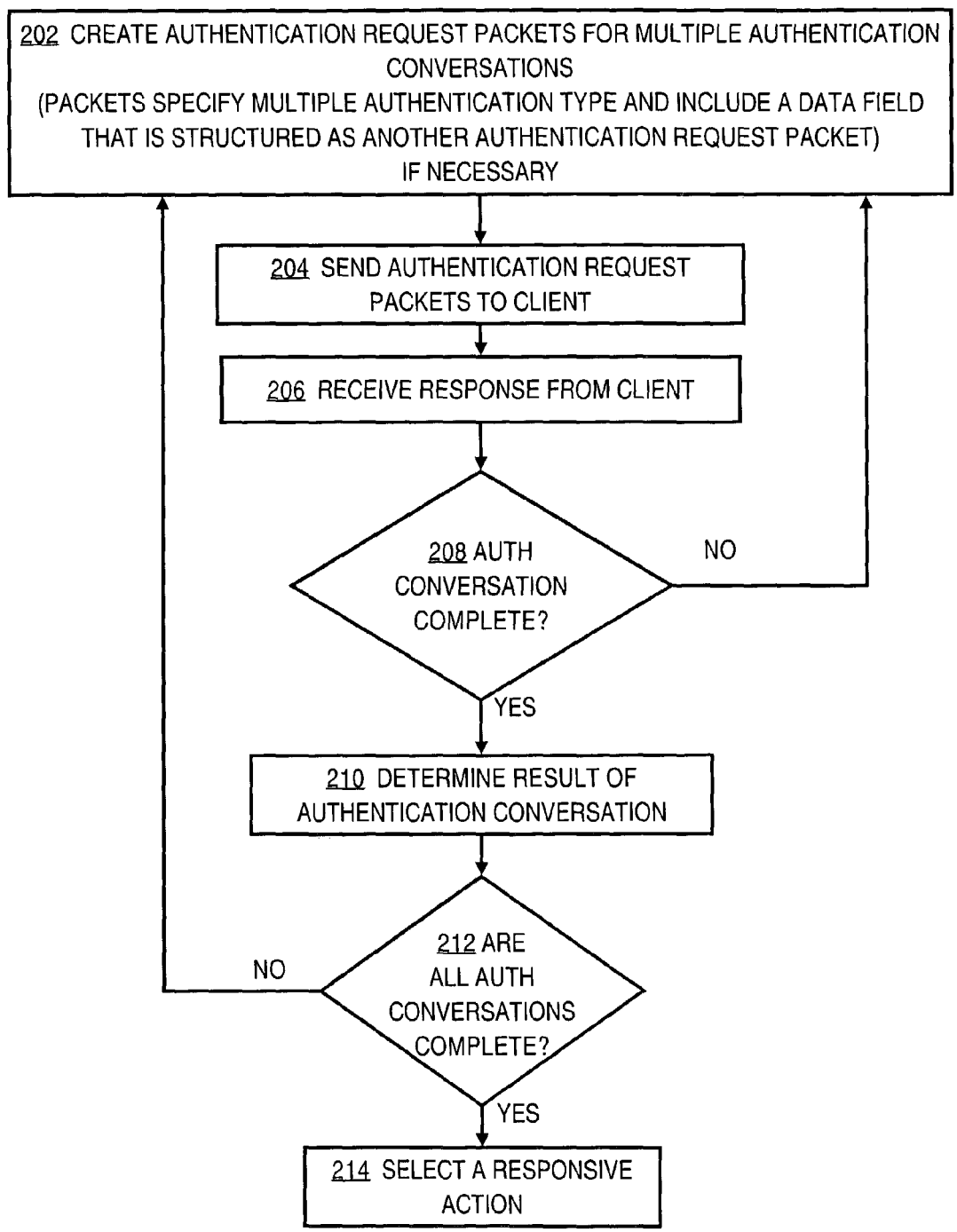
FIG. 2A is a flow diagram that illustrates an example method of providing multiple authentication types within an authentication protocol that supports a single type of authentication, as performed by an authentication server.
Figure 2B:
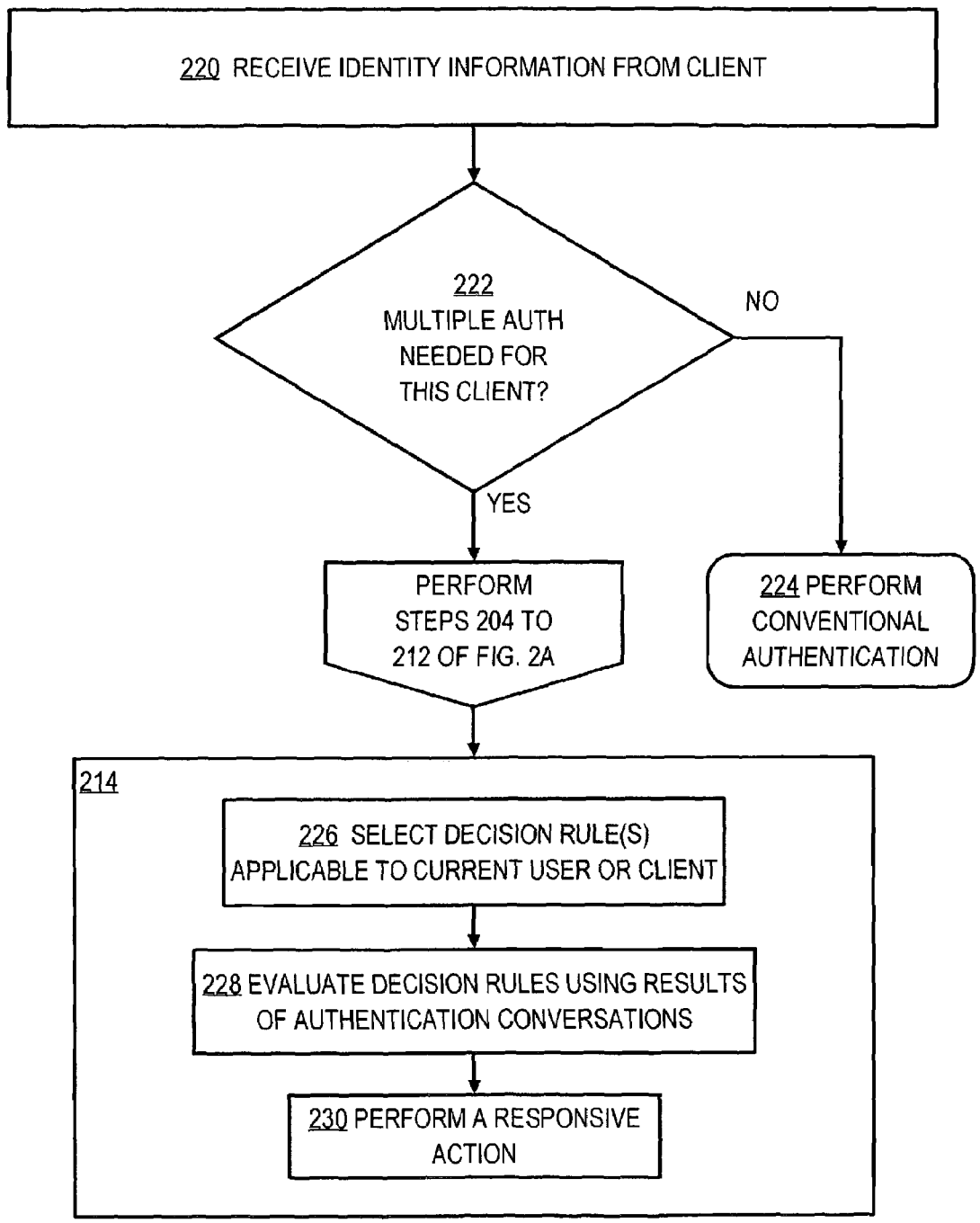
FIG. 2B is a flow diagram that illustrates a second example method of providing multiple authentication types within an authentication protocol that supports a single type of authentication, as performed by an authentication server.

2.0 Providing Multiple Authentication Types within an Authentication Protocol that Supports a Single Type of Authentication 2.1 Process and Message Flow FIG. 2A is a flow diagram that illustrates an example method of providing multiple authentication types within an authentication protocol that supports a single type of authentication, as performed by an authentication server. FIG. 2B is a flow diagram that illustrates a second example method of providing multiple authentication types within an authentication protocol that supports a single type of authentication, as performed by an authentication server. The description of FIG. 2A, FIG. 2B is protocol independent; however, specific embodiments may implement FIG. 2A, FIG. 2B in the context of a specific authentication protocol, such as PEAP or any other EAP-compliant protocol.

Referring first to FIG. 2A, in block 202, one or more authentication request packets for multiple authentication conversations are created. Each of the packets comprises a type value that specifies multiple authentications, and a data field having a value that is structured in compliance with the authentication protocol. Each of the packets is associated with one of a plurality of different authentication conversations with the client. In block 204, the packets are sent to the client.

Figure 3:
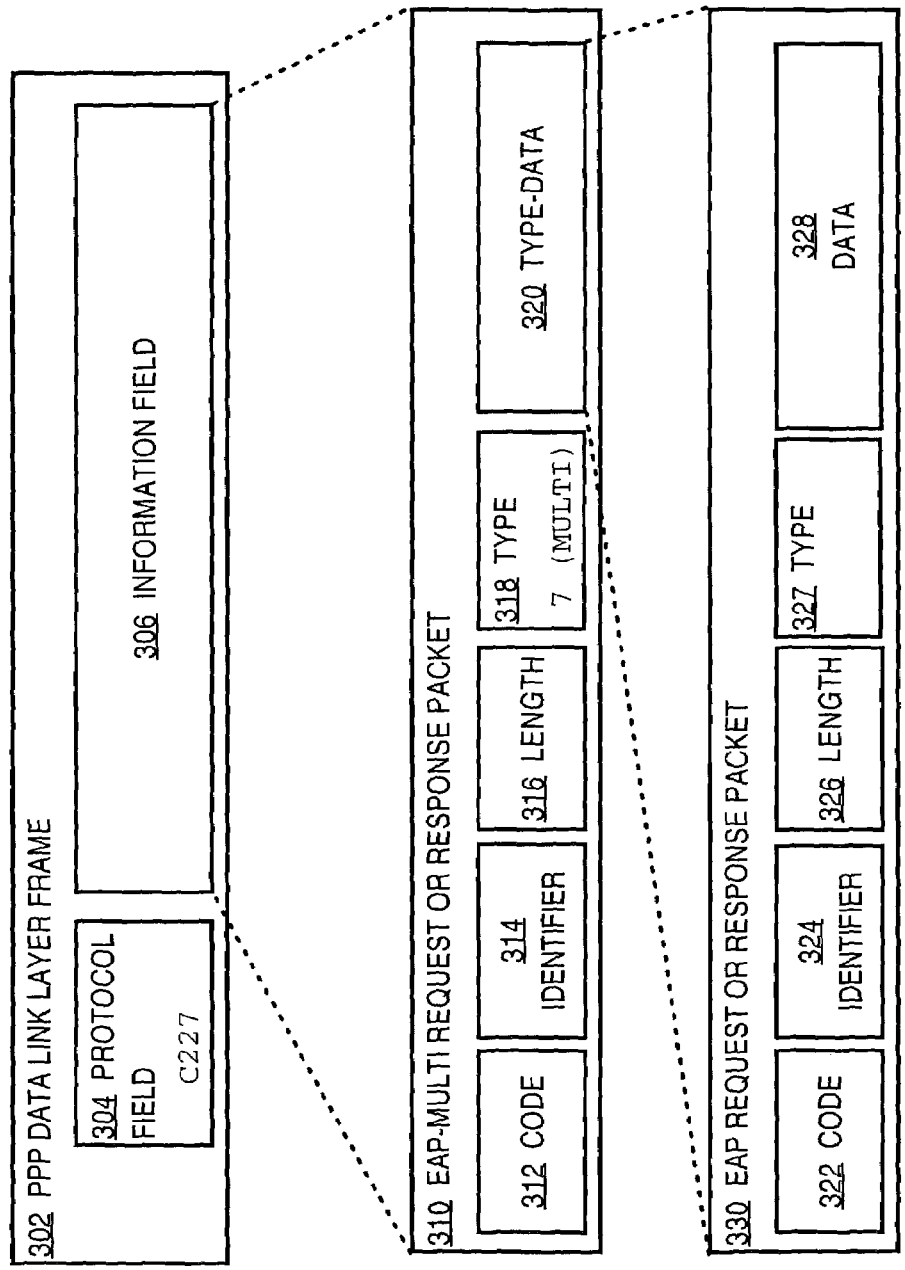
FIG. 3 is a block diagram of a nested authentication request or response message.

FIG. 3 is a block diagram of a nested authentication request or response message that can be used in an EAP embodiment over PPP. A PPP data link layer frame 302 comprises, among other data, a protocol field 304 and an information field 306. A value of hexadecimal "C227" in protocol field 304 signals that PEAP is in use and that information field 306 contains an EAP-compliant packet. Information field 306 carries an EAP-Multi request or response packet 310 having a Code field 312, Identifier field 314, Length field 316, Type field 318, and Type-Data field 320. As provided in conventional EAP request or response packets, Code field 312 specifies whether the packet represents a Request or Response. Identifier field 314 stores a sequence number or similar value that aids in matching responses with requests. Length field 316 indicates the length of the EAP packet including all fields.

Unlike conventional PEAP or other EAP-compliant protocols, according to an embodiment, the Type field 318 carries a value specifying that multiple authentications is in use. Any value that uniquely identifies multiple authentications may be used. IETF RFC 2284 defines Type values 1 through 6, and other later RFCs may define other Type values; thus, a Type value other than those previously defined should be selected.

Further, unlike conventional PEAP or other EAP-compliant protocols, according to an embodiment, the Type-Data field 320 carries a value that is structured as an EAP-compliant packet 330. Thus, the Type-Data field 320 effectively carries a nested EAP-compliant packet. The packet 330 comprises Code field 322, Identifier field 324, Length field 326, and Data field 328. Packet 330 may conform to any EAP-compliant format. Thus, as defined in RFC 2284, Section 2.2, Code field 322 identifies the type of packet 330, and may signify a Request, Response, Success, or Failure. Identifier field 324 carries a value that aids in matching responses with requests. Length field 326 specifies the length of packet 330 including all fields. Type field 327 indicates the EAP-type of the internal conversation in a manner similar to Type field 318 of packet 310. Data field 328 carries data that may vary in format according to the type of the packet 330.

Using packets having this structure, a plurality of different packets 330 may be nested within successive EAP-Multi request or response packets 310. All of the packets 310 have the same Type value that signifies the Multi authentication type. As a result, the restriction of the EAP protocol that requires one authentication type per conversation is observed; however, packets 330 may have any desired Type value. Therefore, a plurality of conversations having any number of authentication types may occur simultaneously, either in parallel or in series, within the context of a Multi authentication conversation. In this description, a Multi type authentication conversation is termed an "outer" conversation and a conversation involving packets 330 of a particular type is termed an "inner" conversation.

Referring again to FIG. 2A, in block 206, a client response message is received in response to one of the authentication request packets that was sent in block 204. When the response is received, in block 208 a test is performed to determine whether a particular inner authentication conversation is complete. If not, then control returns to create additional request packets, send the request packets, and receive client responses as part of the ongoing inner conversation.

If an inner conversation is complete, then in block 210, a result of the inner conversation is determined. Block 210 may involve determining whether a response packet 330 from client 104 comprised a Success or Failure message. If a response packet 330 having a Code value 322 indicating Success or Failure has been received, then block 210 may involve determining a Success or Failure outcome for the inner conversation with which the packet is associated. Alternatively, block 210 may involve determining an outcome based on information other than Code value 322, such as values passed in Data field 328 that are specific to the particular inner conversation.

In block 212, a test is performed to determine whether all inner conversations are complete. If not, then control returns block 202, in which other request packets are created if necessary. The term "if necessary" is provided to account for the following possibilities. An EAP authentication conversation may include more than one request/response exchange; thus, after block 212 the process may need to create another request packet at block 202. Alternatively, at block 202 the process could determine that no new information needs to be sent, and the process only needs to wait for another packet from the client for a different conversation.

If all inner conversations are complete, then in block 214, a responsive action is selected or performed. Examples of responsive actions include granting or denying network access, initiating other inner conversations, generating event messages or notifications, or any other action that can be performed by authentication server 120, access server 108, or other elements of network 110.

Thus, a plurality of responses is received from the client for each of the authentication conversations. The sending and receiving steps are repeated until results are determined for the authentication conversations. The client is authenticated based on results of each of the plurality of authentication conversations.

Referring now to FIG. 2B, which illustrates a second example method of providing multiple authentication types within an authentication protocol that supports a single type of authentication, identity information is received from a client or supplicant at block 220. The identity information may consist of a username, network address, device identifier, or other information that specifies which user or client is attempting network access. The EAP-Identity response carries a displayable string, which usually is a user name, and which can be used as the identity information. Other parameter values important for choosing an authentication method could be extracted from a RADIUS request that encapsulates the EAP message, or from the IP address of the access server that is sending a request, etc. In block 222, a test is performed to determine whether multiple authentications are needed for the client that is identified by the identity information. If so, then steps 204 to 212 of FIG. 2A, inclusive, are performed. If not, then conventional authentication is performed, as indicated by block 224.

Thus, block 220 and block 222 indicate that the process of FIG. 2A may be augmented by receiving and considering identity information, and initiating multiple authentication types only for particular users or clients.

Further, the process of FIG. 2A may be augmented by applying decision rules. In one embodiment, after all authentication conversations are complete (FIG. 2A, block 212), one or more decision rules that apply to the then-current user or client are selected, as shown in block 226. For example, a database or policy repository may store a collection of rules that apply to different users, clients, or roles of users or clients. Based on the identity information, a username lookup is performed or a role is identified. One or more rules are retrieved from the database or repository based on the lookup.

In block 228, the decision rules are evaluated using the results of the authentication conversations, and in block 230, a responsive action is performed. For example, assume that the authentication server 120 performed three (3) different inner authentication conversations with client 104 using three different types of authentication, and assume that results of Success occurred for two (2) of the conversations but Failure occurred for a third. The decision rules that are evaluated at block 228 may include conditional logic that specifies different operations to perform based on the results of the different inner authentication conversations. For example, Success-Success-Failure may result in granting a particular class of restricted network access. Alternatively, Success-Failure-Failure may result in initiating a fourth authentication type.

Use of decision rules is described further below with respect to FIG. 5A and FIG. 5B.

Figure 4B:
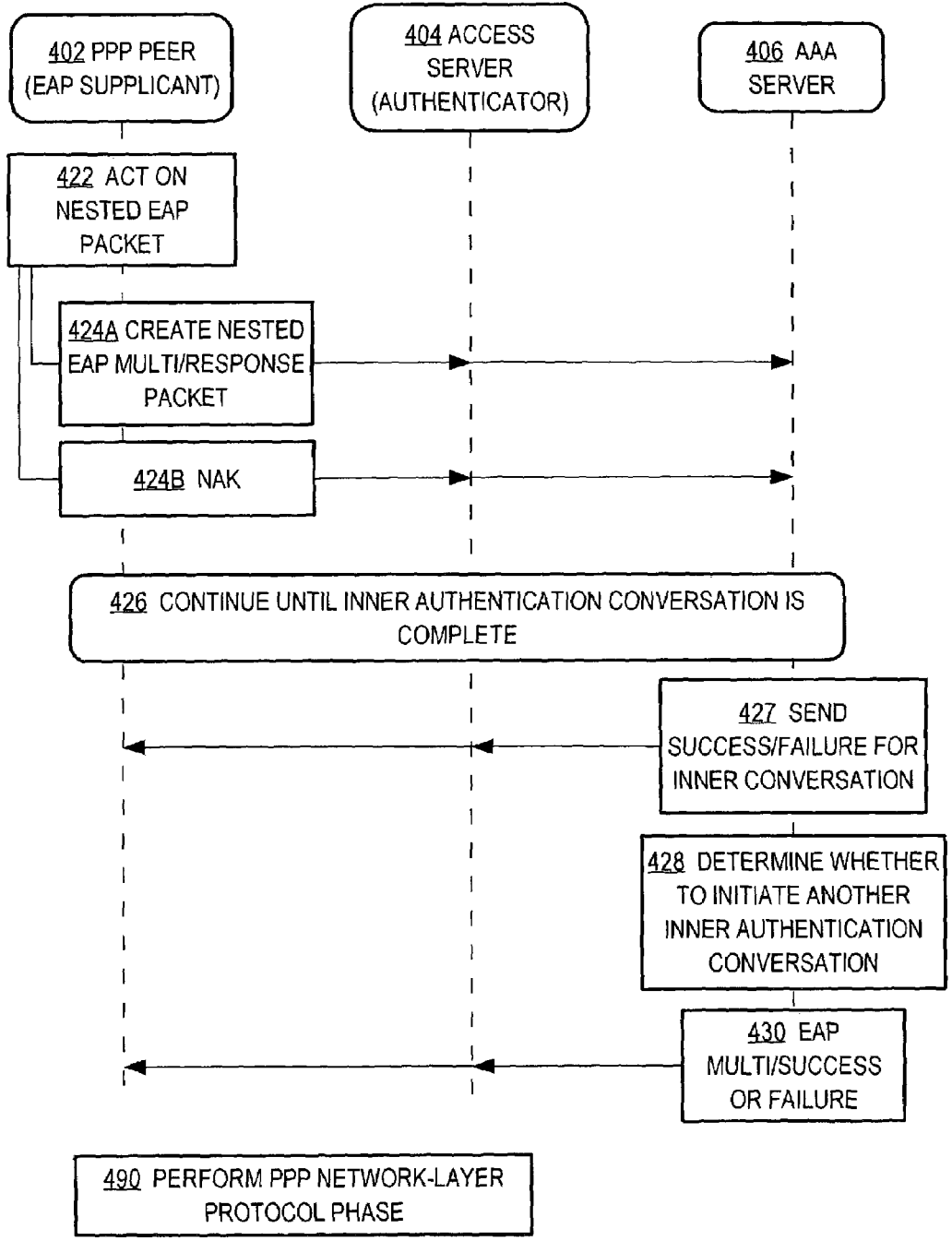

FIG. 4A and FIG. 4B comprise a message flow diagram that illustrates messages that can be communicated by elements of FIG. 1 when an embodiment is in use. FIG. 4A and FIG. 4B represent an embodiment that is used in the specific context of EAP over PPP; however, any other encapsulation protocol may be used, such as RADIUS. Further, FIG. 4A and FIG. 4B represent messages communicated by a PPP peer 402, access server 404, and AAA server 406 of any network arrangement. For purposes of illustrating a simple example, peer 402 is equivalent to client 104, and also may be a "supplicant" as defined in EAP; access server 404 is equivalent to access server 108 of FIG. 1, and also is an "authenticator" as defined in EAP; and AAA server 406 is equivalent to authentication server 120 of FIG. 1.

In block 410, peer 402 and access server 404 perform the PPP link establishment phase as defined in RFC 1661. In PPP, an optional authentication phase follows link establishment. In FIG. 4A and FIG. 4B, blocks 412 through 430, inclusive, represent an authentication phase. PPP concludes with a network-layer protocol phase, as indicated by block 490 (FIG. 4B).

After the Link Establishment phase is complete, in a conventional authentication phase, the authenticator sends one or more Requests to authenticate the peer. The Request has a type field to indicate what is being requested. Examples of Request types include Identity, MD5-challenge, One-Time Passwords, Generic Token Card, etc. Typically, the authenticator will send an initial Identity Request followed by one or more Requests for authentication information. However, an initial Identity Request is not required, and may be bypassed in cases where the identity is presumed based on the network context. The peer sends a Response packet in reply to each Request. As with the Request packet, the Response packet contains a type field that corresponds to the type field of the Request. The authenticator ends the authentication phase with a Success or Failure packet.

As defined by EAP, the access server 404 acting as authenticator typically sends an EAP-Request/Identity packet to the client 104 acting as supplicant, as indicated by block 412. The client responds with an EAP-Response/Identity packet to the authenticator, containing the supplicant's user identifier, as shown by block 414. Such an initial Identity Request/Response exchange is optional.

At block 416, the access server 404 encapsulates and forwards the identity response, and all subsequent EAP packets, to the AAA server 406, as indicated by arrow 417. Thus, while nominally the EAP conversation continues to occur between the authenticator and the peer, the authenticator acts as a pass-through device. All EAP packets received from the client are encapsulated for transmission to the authentication server.

In block 418, a first authentication type is selected. For example, having received the client's Identity, and deter-mined that multiple authentications need to occur, the AAA server 406 creates and sends a nested EAP packet, as indicated by block 419 and block 420. In one embodiment, the nested EAP packet is an EAP-Request packet with the Type value set to EAP-Multi. The data field of the packet can include any EAP messages that could be sent by the EAP peer acting as an authentication server. Examples include an Identity request, Notification, EAP-type request, Success, and Failure.

In block 421, the client (supplicant) supporting EAP-Multi extracts the inner EAP message. Referring now to FIG. 4B, in block 422, the client acts on the nested EAP packet according to its content, as in a normal EAP conversation. For example, in block 424A, a nested EAP-Multi/Response packet is created and sent. Thus, all messages related to the inner conversation are encapsulated into an EAP-Multi/Response packet. Further, the EAP same Type value (Multi) is specified in all packets exchanged by the supplicant and authenticator, and the inner conversations are transparent for the authenticator, which observes only the EAP-Multi session.

Alternatively, if the client does not support the inner EAP type, it encapsulates an EAP negative acknowledge (NAK) message into an EAP-Multi/Response packet, as shown by block 424B.

Blocks 419, 420, 421, 422, 424A, and 424B iterate until the inner authentication conversation is complete, as indicated by block 426. Thereafter, the AAA server 406 ends the inner EAP conversation with a Success or Failure message that is encapsulated into an EAP-Multi/Request packet, as indicated by block 427. However, the end of an inner conversation does not necessary terminate the entire PPP authentication phase. As shown by block 428, the AAA server may decide to start another inner authentication session in order to check different type of credential. The client (supplicant) does not cancel or shut down the EAP-Multi conversation upon completion of an inner EAP session.

After a single or multiple inner EAP conversation, the AAA server 406 ends the whole authentication session by sending an EAP-Multi/Success or EAP-Multi/Failure message, as indicated by block 430. Under PPP, the network-layer protocol phase may then proceed, as shown by block 490.

Thus, the EAP-Multi protocol described in this application provides a solution for complex authentication procedures, which could involve different authentication protocols and different credential types.

Logic for implementing an EAP-Multi authentication type as described herein may be implemented by defining a new EAP method. For example, authentication methods 112A, 112B of FIG. 1 may define or implement the EAP-Multi method. In this arrangement, any authenticator that is compliant with EAP automatically supports EAP-Multi. Thus, it is possible to implement a sophisticated authentication system without upgrading an existing network device infrastructure.

EAP-Multi as described herein is a lightweight protocol. The computational and network overhead of using EAP-Multi as a wrapper for inner EAP conversations is minimal. Almost no operational overhead is involved in deploying beyond any efforts required to deploy specific EAP-type client software on each supplicant. The Microsoft EAP API, client software, and supporting methods can be used. In this arrangement, the EAP-Multi authentication type defined herein can be implemented as a method that is callable using the Microsoft EAP API from either client 104 or authentication server 120. API 114A, 114B may be the Microsoft API.

2.2 Using Multiple Authentication Types and Policy Rules

The EAP-Multi authentication type is extensible. The EAP-Multi authentication type may be used in an inner protocol within other tunneling EAP protocols, e.g. PEAP, or within another EAP-Multi session. By using EAP-Multi, the system administrator can define a complex hierarchical or nested rule set for different types of credential validations.

Figure 5A:
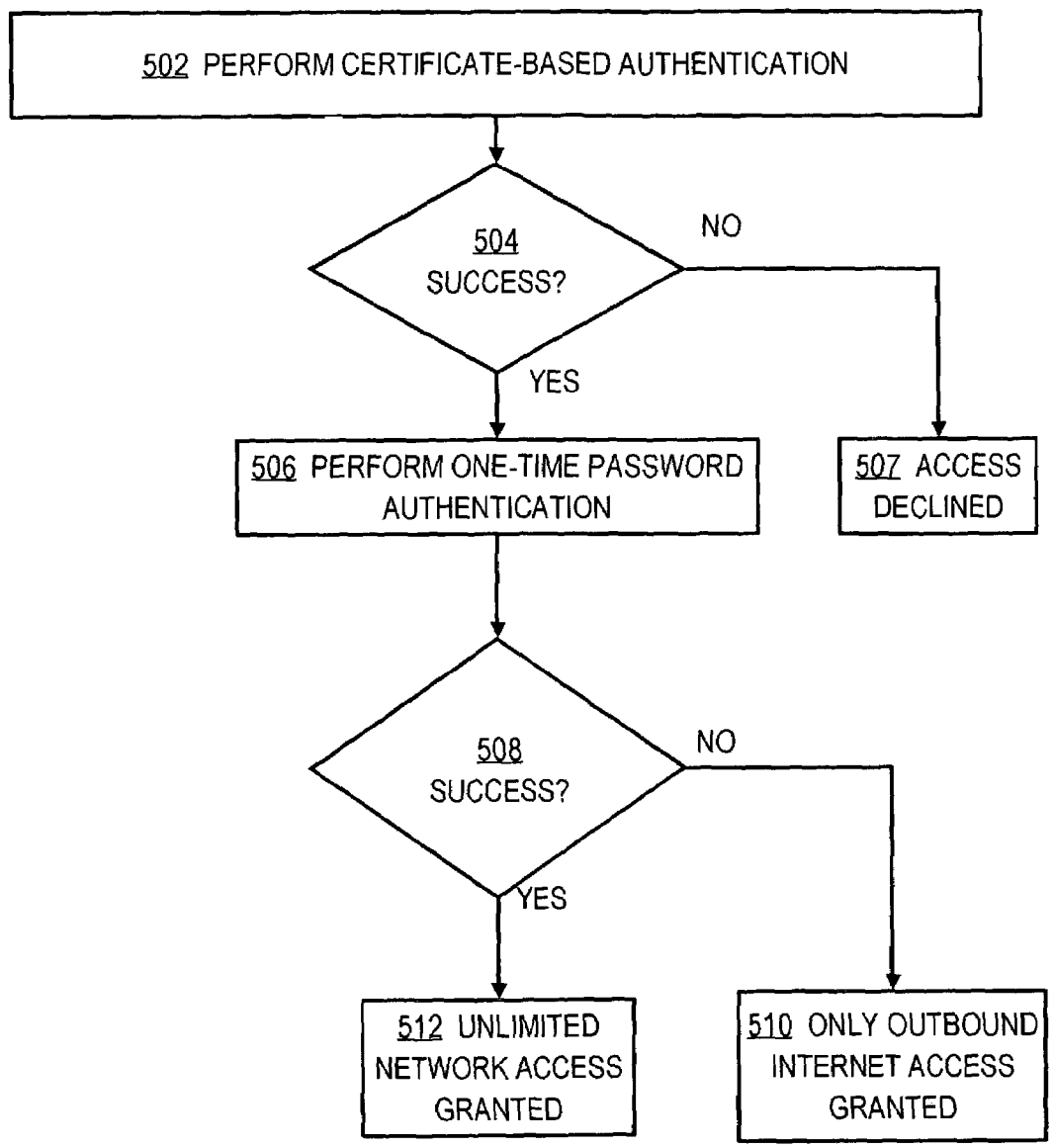
FIG. 5A and FIG. 5B are flow diagrams that illustrate example multiple authentication processes as defined by policy rules.
Figure 5B:
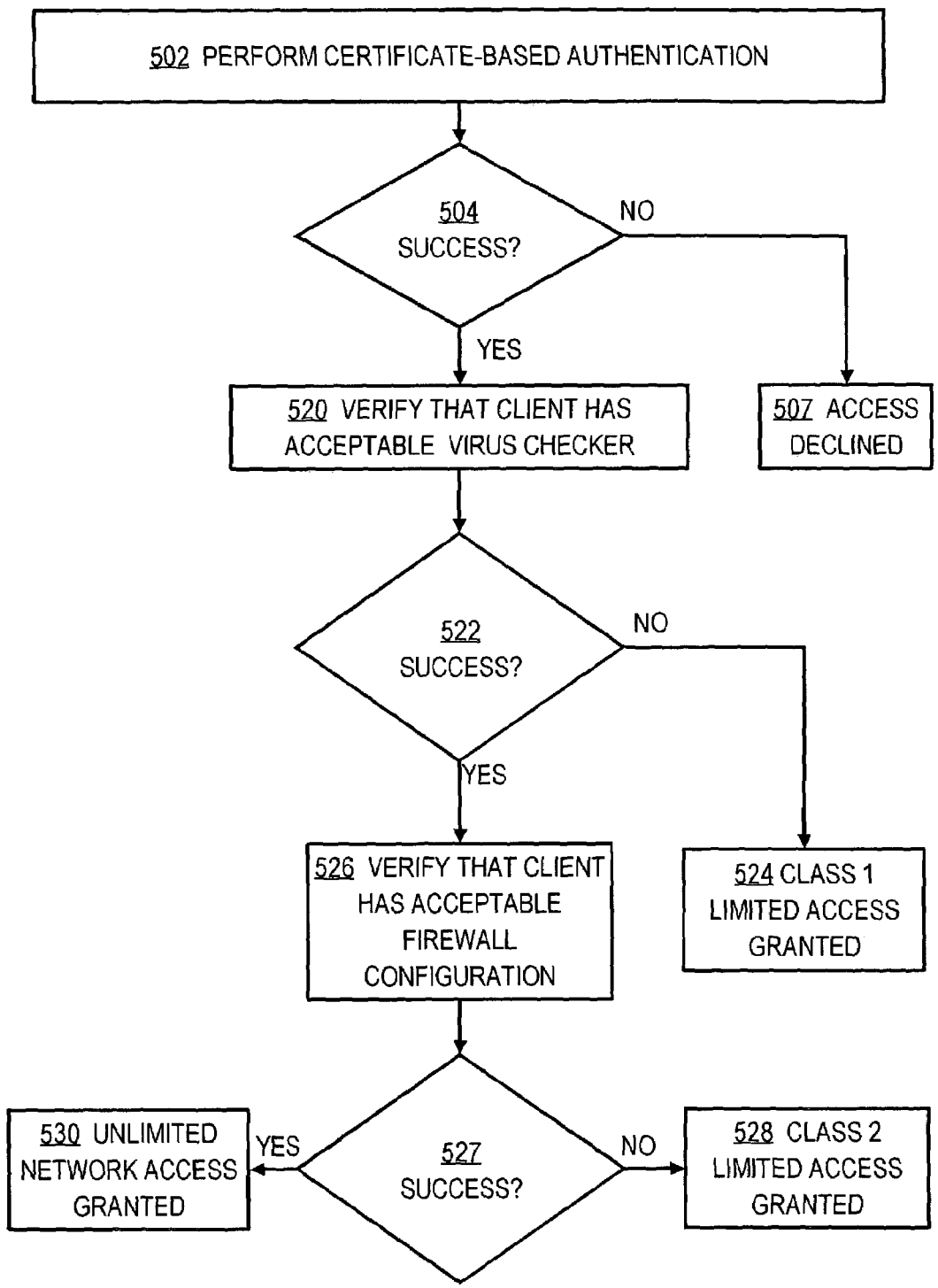

FIG. 5A and FIG. 5B are flow diagrams that illustrate example multiple authentication processes as defined by policy rules. Referring first to FIG. 5A, in block 502, certificate-based authentication is performed. Block 502 may be implemented by performing a first EAP-Multi inner conversation in which nested EAP packets have a Type value that specifies certificate-based authentication. As a result, in the inner conversation, the client and AAA server cooperate to provide and verify a digital certificate. In this context, "certificate-based authentication may be EAP-TLS, as described in RFC 2716.

In block 504, the AAA server performs a test to determine whether the certificate-based authentication resulted in success. If not, then network access is declined, as shown in block 507. If success occurred, then in block 506, one-time password authentication is performed. Block 507 may be implemented by performing a second EAP-Multi inner conversation, consecutively or in parallel with respect to the first inner conversation, in which nested EAP packets have a Type value that specifies one-time password authentication. As a result, in the second inner conversation, the AAA server causes the client to prompt the user to enter a one-time password from a token card or similar device, and the AAA server receives the one-time password and verifies it.

In block 508, another test is performed to determine whether the one-time password authentication was successful. If so, then unlimited network access is granted in block 512. If the one-time password authentication failed, then in block 510 only outbound Internet access is granted.

The process of FIG. 5A could be practiced in a situation where a corporate user is attempting network access from an unknown machine within a campus network. With the ability to enforce multiple authentication methods, the enterprise administrator can choose to enforce a certificate based authentication and one-time password authentication. If the user succeeds in both, thus providing a high level of confidence about his authenticity, the administrator could choose to operate a policy that granted access to sensitive areas of the network. Conversely, if the user passes just the first test, his access could be constrained to outbound access to the Internet, as less confidence in the user's authenticity is justified.

As another example, the process of FIG. 5B may be used to implement a policy rule that may be expressed informally as: "First, check client digital certificate. If the certificate is valid, then check for the version of a virus checker that is installed on the client; if the version is acceptable, then accept the client; else reject the client. If the virus checker is properly updated, then check whether the personal firewall settings of the client are acceptable; if so, accept the client, else reject the user."

In block 502, certificate-based authentication is performed, in the same manner described above for FIG. 5B. If failure occurs, as tested in block 504, then in block 507, network access is declined. If success occurs, then in block 520 a second inner authentication conversation is initiated to verify that the client has an acceptable virus checker that is properly updated. Block 520 can be performed, for example, using packets of an inner conversation that specify an EAP Type associated with verifying a virus checker, and using a compatible EAP method that is accessible to the client using an API. Thus, performing checks such as virus checker verification and checking other credentials assumes that the client has access to a software method that can implement such verification or checks.

In block 522, a test is performed to determine whether the virus checker is acceptable or fully updated. If failure occurs, then in block 524 a first class of limited network access is granted. Thus, if the client passes the first test (block 502) but fails the second test (block 520) then a different level, degree, or "quality of access" ("QoA") may be applied.

Alternatively, if success occurs, then in block 526 a third test is applied to verify that the client has an acceptable personal firewall configuration. Block 526 may involve initiating a third inner authentication conversation that invokes a client-side method to determine the client's personal firewall settings and return the settings to the AAA server. If the third inner authentication conversation results in success, as tested at block 527, then unlimited network access is granted, as shown in block 530. Alternatively, a second quality of access is applied at block 528.

The logic of FIG. 5A or FIG. 5B may be represented in a policy rule that is retrieved and applied as part of block 214 of FIG. 2B, or block 428 of FIG. 4B. Thus, unlike conventional EAP or PEAP, which provide for only two possible authentication outcomes (Success or Failure), embodiments of multiple authentications as described herein can use complex policy rules that provide for any number of authentication outcomes. In the example of FIG. 5A, there are three (3) outcomes, represented by block 507, 510, 512, respectively. FIG. 5B has four (4) outcomes represented by block 507, 524, 528, 530, respectively.

Granting multiple different types of access as indicated at block 510, 512, 524, 528, 530, can be implemented using an access server that supports multiple different VLANs. For example, CiscoSecure ACS can download, to a device, a particular VLAN number that indirectly indicates a type or level of access; the device becomes part of the specified VLAN and can only access resources that permit access by the specified VLAN. Alternatively, granting access may involve specifying the name of an access control list (ACL) that limits user access in a particular way.

The foregoing examples present relatively simple scenarios. Much more sophisticated approaches can be practiced using the techniques herein, particularly as new EAP methods are developed to provide information on other credential types. Thus, the techniques herein allow the development of much more capable and sophisticated network behavior, because more granular information relating to each user request is obtained at authentication time. Additionally, new capabilities, such as networking quarantining and access policies based on authentication method are enabled with EAP-Multi.

4.0 Implementation Mechanisms—Hardware Overview

Figure 6:
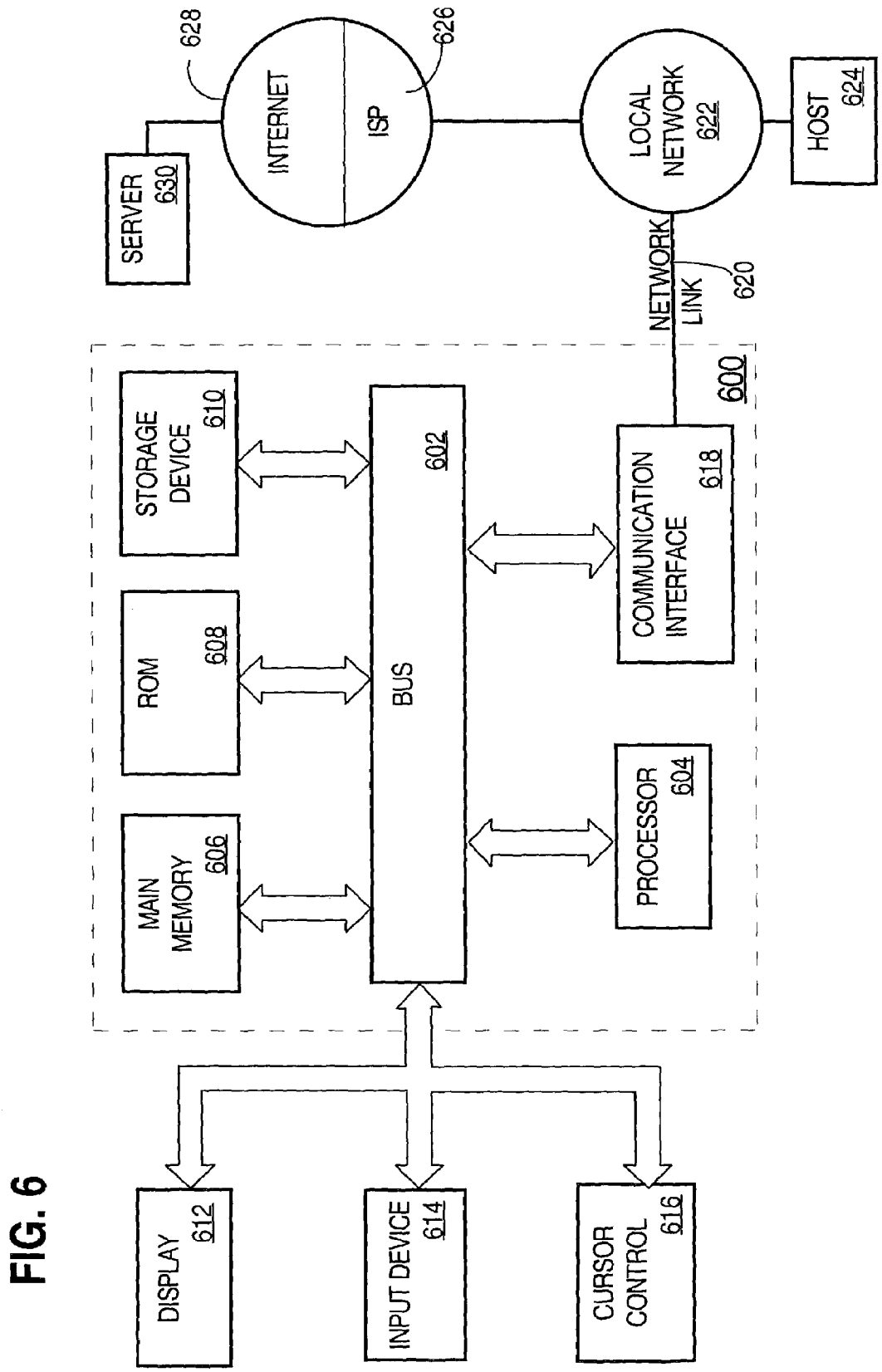
FIG. 6 is a block diagram that illustrates a computer system with which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing multiple authentication types within an authentication protocol that supports a single type. According to one embodiment of the invention, providing multiple authentication types within an authentication protocol that supports a single type is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602.

Common forms of computer-readable media include, for example, a floppy disk, a flexible disk, hard disk, magnetic tape, or any other magnetic medium from which a computer can read, a CD-ROM, any other optical medium from which a computer can read, punchcards, papertape, any other physical medium with patterns of holes from which a computer can read, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for providing multiple authentication types within an authentication protocol that supports a single type as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing multiple authentication types within an authentication protocol that supports a single type of authentication for a client in communication with an authorization server over a network, the method comprising the computer-implemented steps of:

creating and sending to the client, a plurality of outer packets in compliance with an authentication protocol, wherein the plurality of outer packets is associated with an outer authentication conversation in compliance with the authentication protocol, wherein each of the outer packets contains, within a data field, a value that is also structured as an inner packet in compliance with the authentication protocol, wherein each of the inner packets is associated with one inner authentication conversation of a plurality of inner authentication conversations with the client, and wherein the plurality of inner authentication conversations is exclusively associated with the outer authentication conversation;

receiving a plurality of responses from the client for each of the inner authentication conversations;

based on the plurality of responses, determining a combination of results for the plurality of inner authentication conversations, wherein each result of the combination of results is for one inner authentication conversation of the plurality of inner authentication conversations;

determining a result for the outer authentication conversation based on the combination of results for the plurality of inner authentication conversations; and performing a responsive action based on the result for the outer authentication conversation.

2. A method as recited in claim 1, wherein the responsive action includes determining whether to authenticate the client.

3. A method as recited in claim 1, further comprising the steps of:

receiving identity information from the client;

based on the identity information, determining that a certain plurality of inner authentication conversations is required for the client.

4. A method as recited in claim 1, wherein the responsive action includes determining whether to grant access to one or more network resources.

5. A method as recited in claim 1, wherein the authentication protocol is compliant with Extensible Authentication Protocol (EAP).

6. A method as recited in claim 1, wherein the plurality of inner authentication conversations is a plurality of sequential authentication conversations, wherein each of the inner authentication conversations is associated with testing a different client authentication parameter.

7. A method as recited in claim 1, wherein the plurality of inner authentication conversations is a plurality of parallel authentication conversations, wherein each of the authentication conversations is associated with testing a different client authentication parameter.

8. A method as recited in claim 1, wherein each of the responses is created using a multiple authentication client plug-in module.

9. A method as recited in claim 1, further comprising the steps of:

determining, based on the combination of results, to initiate an additional inner authentication conversation with the client for testing an additional client authentication parameter.

10. A method as recited in claim 1, wherein the preceding steps are defined by an EAP multiple-authentication method that is implemented by an EAP-compliant authenticator.

11. A method as recited in claim 1, wherein each of the responses is created using EAP multiple authentication logic in an EAP-compliant client plug-in.

12. A method as recited in claim 1, wherein each of the responses is created using EAP multiple authentication logic in a client software module that is callable using a Microsoft EAP API.

13. A method as recited in claim 1, wherein determining the result for the outer authentication conversation includes:

evaluating the combination of results using one or more validation rules; and wherein the responsive action includes determining to generate a success message or a failure message for the client based on the result for the outer authentication conversation.

14. A method as recited in claim 13, wherein the validation rules represent a hierarchy of tests of different validation credentials.

15. A method as recited in claim 1, wherein each of the outer packets comprises a same type value, wherein the type value specifies multiple authentications.

16. A method of providing multiple authentication types within an authentication protocol that supports a single type of authentication, the method comprising the computer-implemented steps of:

receiving identity information from the client;

based on the identity information, determining that a plurality of inner authentication conversations is required for the client;

creating and sending to the client, a plurality of outer packets compliant with an authentication protocol, wherein the plurality of outer packets is associated with an outer authentication conversation in compliance with the authentication protocol, wherein each of the outer packets comprises a type value that specifies multiple authentication and a data field having a value that is also structured as an inner packet in compliance with the authentication protocol, wherein each of the inner packets is associated with one of a plurality of inner authentication conversations with the client, and wherein the plurality of inner authentication conversations is exclusively associated with the outer authentication conversation;

receiving a plurality of responses from the client for each of the of inner authentication conversations;

based on the plurality of responses, determining a combination of results for the plurality of inner authentication conversations, wherein each result of the combination of results is for one of the plurality of inner authentication conversations;

determining a result for the outer authentication conversation based on the combination of results for the plurality of inner authentication conversations; and determining whether to grant access to one or more network resources based on the result for the outer authentication conversation.

17. A method of performing multiple authentication operations using Extensible Authentication Protocol (EAP), the method comprising the computer-implemented steps of:

initiating an outer EAP authentication conversation between an authenticator and a client comprising a plurality of EAP request packets, wherein each EAP request packet of the outer EAP authentication conversation contains, within a data field, a value that is structured as an inner EAP packet, wherein the inner packet is associated with one of a plurality of different inner EAP authentication conversations, and wherein the plurality of different inner EAP authentication conversations is exclusively associated with the outer EAP authentication conversation;

receiving a plurality of responses from the client for each of the inner EAP authentication conversations;

determining a combination of results for the plurality of different inner EAP authentication conversations, wherein each result of the combination of results is determined for each of the inner EAP authentication conversations based on the plurality of responses;

determining a result for the outer EAP authentication conversation based on the combination of results for the plurality of different inner EAP authentication conversations; and performing a responsive action based on the result for the outer EAP authentication conversation.

18. A method as recited in claim 17, further comprising the step of wherein the responsive action includes determining whether to grant access to one or more network resources.

19. A method as recited in claim 17, wherein all request packets associated with the outer EAP authentication conversation comprise a same type value, and wherein the type value specifies multiple authentications.

20. A method of performing multiple authentication operations using Extensible Authentication Protocol (EAP), the method comprising the computer-implemented steps of:

(A) sending a plurality of first EAP request packets, wherein the first EAP request packets are associated with an outer EAP authentication conversation between an authenticator and a client, wherein each of the first EAP request packets comprises a type value that specifies multiple authentication and contains, within a data field, a value that is structured as a first inner EAP packet, wherein the inner EAP packet is associated with a first inner EAP authentication conversation for authenticating the client using a first authentication method;

(B) sending a plurality of second EAP request packets, wherein the second EAP request packets are associated with the outer EAP authentication conversation between the authenticator and the client, wherein each of the second EAP request packets comprises the type value that specifies multiple authentication and contains, within a second data field, a second value that is structured as a second inner EAP packet, wherein the second inner EAP packet is associated with a second inner EAP authentication conversation for authenticating the client using a second authentication method that is different from the first authentication method;

(C) receiving a plurality of first EAP response packets from the client associated with the outer EAP authentication conversation, wherein each of the first EAP response packets comprises a type value that specifies multiple authentications and contains, within a data field, a value that is structured as an inner EAP packet;

(D) receiving a plurality of second EAP response packets from the client associated with the outer EAP authentication conversation, wherein each of the second EAP response packets comprises a type value that specifies multiple authentications and contains, within a data field, a value that is structured as another EAP packet;

(E) repeating steps (A) and (C) to determine a first result for the first inner EAP authentication conversation;

(F) repeating steps (B) and (D) to determine a second result for the second inner EAP authentication conversation;

(G) based on the first result and the second result, selecting one of a plurality of authentication outcomes for the outer EAP conversation.

21. A method as recited in claim 20, wherein one of the authentication outcomes for the outer EAP conversation comprises initiating a third EAP authentication conversation using a third authentication method that is different from the first authentication method and the second authentication method when one or more of the first result and second result represent failure.

22. A method as recited in claim 20, wherein one of the authentication outcomes for the outer EAP conversation comprises granting a first class of network access when one of the first result and second result represent success and granting a second class of network access when both the first result and second result represent success.

23. A computer-readable volatile and non-volatile storage medium carrying one or more sequences of instructions for providing multiple authentication types within an authentication protocol that supports a single type of authentication for a client in communication with an authorization server over a network, which instructions, when executed by one or more processors, cause the one or more processors to carry out the steps of:

creating and sending to the client, a plurality of outer packets in compliance with an authentication protocol, wherein the plurality of outer packets is associated with an outer authentication conversation in compliance with the authentication protocol, wherein each of the outer packets contains, within a data field, a value that is also structured as an inner packet in compliance with the authentication protocol, wherein each of the inner packets is associated with one inner authentication conversation of a plurality of inner authentication conversations with the client, and wherein the plurality of inner authentication conversations is exclusively associated with the outer authentication conversation;

receiving a plurality of responses from the client for each of the inner authentication conversations;

based on the plurality of responses, determining a combination of results for the plurality of inner authentication conversations, wherein each result of the combination of results is for one inner authentication conversation of the plurality of inner authentication conversations;

determining a result for the outer authentication conversation based on the combination of results for the plurality of inner authentication conversations; and performing a responsive action based on the result for the outer authentication conversation.

24. A computer-readable volatile and non-volatile storage medium as recited in claim 23, wherein the responsive action includes determining whether to authenticate the client.

25. A computer-readable volatile and non-volatile storage medium as recited in claim 23, wherein the instructions further comprise the steps of:

receiving identity information from the client;

based on the identity information, determining that a certain plurality of inner authentication conversations is required for the client.

26. A computer-readable volatile and non-volatile storage medium as recited in claim 23, wherein the responsive action includes determining whether to grant access to one or more network resources.

27. A computer-readable volatile and non-volatile storage medium as recited in claim 23, wherein the authentication protocol is compliant with Extensible Authentication Protocol (EAP).

28. A computer-readable volatile and non-volatile storage medium as recited in claim 23, wherein the plurality of inner authentication conversations is a plurality of sequential authentication conversations, wherein each of the inner authentication conversations is associated with testing a different client authentication parameter.

29. A computer-readable volatile and non-volatile storage medium as recited in claim 23, wherein the plurality of inner authentication conversations is a plurality of parallel authentication conversations, wherein each of the authentication conversations is associated with testing a different client authentication parameter.

30. A computer-readable volatile and non-volatile storage medium as recited in claim 23, wherein each of the responses is created using a multiple authentication client plug-in module.

31. A computer-readable volatile and non-volatile storage medium as recited in claim 23, further comprising the steps of:
   determining, based on the combination of results, to initiate an additional inner authentication conversation with the client for testing an additional client authentication parameter.

32. A computer-readable volatile and non-volatile storage medium as recited in claim 23, wherein the preceding steps are defined by an EAP multiple-authentication method that is implemented by an EAP-compliant authenticator.

33. A computer-readable volatile and non-volatile storage medium as recited in claim 23, wherein each of the responses is created using EAP multiple authentication logic in an EAP-compliant client plug-in.

34. A computer-readable volatile and non-volatile storage medium as recited in claim 23, wherein each of the responses is created using EAP multiple authentication logic in a client software module that is callable using a Microsoft EAP API.

35. A computer-readable volatile and non-volatile storage medium as recited in claim 23, wherein: determining the result for the outer authentication conversation includes:
   evaluating the combination of results using one or more validation rules; and
   wherein the responsive action includes determining to generate a success message or a failure message for the client based on the result for the outer authentication conversation.

36. A computer-readable volatile and non-volatile storage medium as recited in claim 35, wherein the validation rules represent a hierarchy of tests of different validation credentials.

37. A computer-readable volatile and non-volatile storage medium as recited in claim 23, wherein each of the outer packets comprises a same type value, wherein the type value specifies multiple authentications.

38. An apparatus for providing multiple authentication types within an authentication protocol that supports a single type of authentication for a client in communication with an authorization server over a network, comprising:
   a network interface that is coupled to the data network for receiving one or more packet flows therefrom;
   a processor; and
   means for creating and sending to the client, a plurality of outer packets in compliance with an authentication protocol,
      wherein the plurality of outer packets is associated with an outer authentication conversation in compliance with the authentication protocol,
      wherein each of the outer packets contains, within a data field, a value that is also structured as an inner packet in compliance with the authentication protocol,
      wherein each of the inner packets is associated with one inner authentication conversation of a plurality of inner authentication conversations with the client, and
      wherein the plurality of inner authentication conversations is exclusively associated with the outer authentication conversation;
   means for receiving a plurality of responses from the client for each of the inner authentication conversations;
   based on the plurality of responses, determining a combination of results for the plurality of inner authentication conversations, wherein each result of the combination of results is for one inner authentication conversation of the plurality of inner authentication conversations; and
   determining a result for the outer authentication conversation based on the combination of results for the plurality of inner authentication conversations; and
   performing a responsive action based on the result for the outer authentication conversation.

39. An apparatus for providing multiple authentication types within an authentication protocol that supports a single type of authentication for a client in communication with an authorization server over a network, comprising:
   a network interface that is coupled to the data network for receiving one or more packet flows therefrom;
   a processor;
   one or more stored sequences of instructions which, when executed by the processor, cause the processor to carry out the steps of:
      creating and sending to the client, a plurality of outer packets in compliance with an authentication protocol,
         wherein the plurality of outer packets is associated with an outer authentication conversation in compliance with the authentication protocol,
         wherein each of the outer packets contains, within a data field, a value that is also structured as an inner packet in compliance with the authentication protocol,
         wherein each of the inner packets is associated with one inner authentication conversation of a plurality of inner authentication conversations with the client, and
         wherein the plurality of inner authentication conversations is exclusively associated with the outer authentication conversation;
      receiving a plurality of responses from the client for each of the inner authentication conversations;
      based on the plurality of responses, determining a combination of results for the plurality of inner authentication conversations, wherein each result of the combination of results is for one inner authentication conversation of the plurality of inner authentication conversations;
      determining a result for the outer authentication conversation based on the combination of results for the plurality of inner authentication conversations; and
      performing a responsive action based on the result for the outer authentication conversation.

40. A method as recited in claim 1, wherein a first authentication type of a first inner packet is different from a second authentication type of a second inner packet.

41. A computer-readable volatile and non-volatile storage medium as recited in claim 23, wherein a first authentication type of a first inner packet is different from a second authentication type of a second inner packet.

42. An apparatus as recited in claim 38, wherein a first authentication type of a first inner packet is different from a second authentication type of a second inner packet.

43. An apparatus as recited in claim 39, wherein a first authentication type of a first inner packet is different from a second authentication type of a second inner packet.

* * * * *